United States Patent
Ho et al.

(10) Patent No.: US 7,221,914 B2
(45) Date of Patent: May 22, 2007

(54) FLIP-COVER MOBILE PHONE WITH COVER-ON TALKING CAPABILITY

(75) Inventors: Shyuan-Jeng Ho, Hsinchu (TW);
Ching-Tung Wang, Hsinchu Hsien (TW)

(73) Assignee: TPO Displays Corp., Chu-Nan (TW)

( * ) Notice: Subject to any disclaimer, the term of this patent is extended or adjusted under 35 U.S.C. 154(b) by 486 days.

(21) Appl. No.: 10/249,219

(22) Filed: Mar. 24, 2003

(65) Prior Publication Data
US 2004/0203512 A1    Oct. 14, 2004

(30) Foreign Application Priority Data
Oct. 1, 2002  (TW)  ............... 91215508 U

(51) Int. Cl.
*H04B 1/38* (2006.01)

(52) U.S. Cl. ............... 455/90.3; 455/575.8; 455/575.1; 455/566; 455/550.1; 455/575.3; 379/433.13; 379/434; 379/433.12

(58) Field of Classification Search ............... 455/90.3, 455/575.3, 575.8, 575.1, 575.7, 566; 379/433.13, 379/434, 433.12, 433.06
See application file for complete search history.

(56) References Cited

U.S. PATENT DOCUMENTS

| | | | | |
|---|---|---|---|---|
| 6,108,417 A | * | 8/2000 | Thomas et al. | 379/433.13 |
| 6,125,289 A | * | 9/2000 | Lee | 455/575.3 |
| 6,141,540 A | * | 10/2000 | Richards et al. | 455/575.3 |
| 6,157,717 A | * | 12/2000 | Chintala et al. | 379/433.13 |
| 6,230,028 B1 | * | 5/2001 | Shirakawa | 455/566 |
| 6,256,481 B1 | * | 7/2001 | Jeong et al. | 455/575.3 |
| 6,300,910 B1 | * | 10/2001 | Kim | 343/702 |
| 6,370,362 B1 | * | 4/2002 | Hansen et al. | 455/90.1 |
| 6,470,175 B1 | * | 10/2002 | Park et al. | 455/90.1 |
| 6,567,672 B1 | * | 5/2003 | Park et al. | 455/574 |
| 6,667,731 B2 | * | 12/2003 | Park | 345/102 |
| 6,785,562 B2 | * | 8/2004 | Lee et al. | 455/566 |
| 6,885,849 B1 | * | 4/2005 | Kim et al. | 455/90.3 |
| 6,907,276 B2 | * | 6/2005 | Toba | 455/566 |
| 6,968,161 B2 | * | 11/2005 | Inomata et al. | 455/90.3 |

* cited by examiner

*Primary Examiner*—Marceau Milord
(74) *Attorney, Agent, or Firm*—Liu & Liu

(57) ABSTRACT

A flip-cover mobile phone with cover-on talking capability. The phone has a plurality of buttons on the front surface of the phone but can be hidden away by the cover. The surface of the phone further includes a loudspeaker, a microphone, a communication on/off button and a touch-sensitive screen. Incoming calls can be received simply by pressing the communication on/off button so that talking is possible with the cover on. With the addition of a touch-sensitive screen, the phone may be operated without lifting the flip cover.

19 Claims, 4 Drawing Sheets

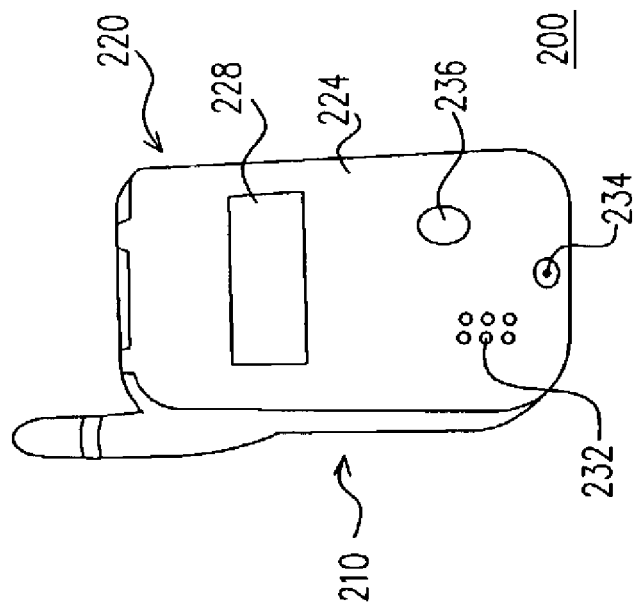
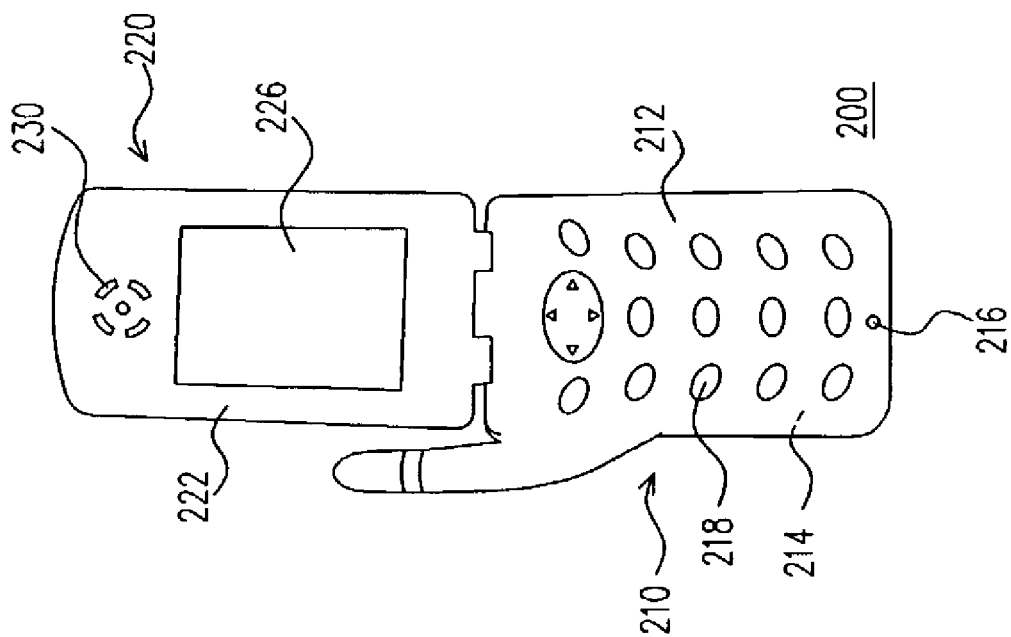
FIG. 2B
FIG. 2A

FLIP-COVER MOBILE PHONE WITH COVER-ON TALKING CAPABILITY

CROSS REFERENCE TO RELATED APPLICATIONS

This application claims the priority benefit of Taiwan application serial no. 91215508, filed on Oct. 1, 2002.

BACKGROUND OF INVENTION

1. Field of Invention

The present invention relates to a flip-cover mobile phone. More particularly, the present invention relates to a flip-cover mobile phone capable of receiving incoming calls and being operated without lifting up the cover.

2. Description of Related Art

As electronic technology rapidly progresses, mobile phones have become a fast and convenient communication tool to transfer information between people. At present, one common type of mobile telephone has a cover that can flip over to cover the buttons on the phone body. FIGS. 1A and 1B are front views of a conventional flip-cover mobile phone, one having the cover lifted up and the other having the cover flipped back over the main body. As shown in FIGS. 1A and 1B, the flip-cover mobile phone 100 mainly includes a phone body 110 and a flip cover 120. The flip cover 120 is, for example, hinged to the phone body 110 so that the cover 120 may flip over the main body 110 or lift up for normal operation. In general, the flip cover 120 includes a main screen 122, a sub-screen 124 and a loudspeaker 126. The main screen 122 and the loudspeaker 126 are placed on the inner surface of the flip cover 120 while the sub-screen 124 is placed on the outer surface of the cover 120. In addition, the phone body 110 normally has a microphone 112 and a plurality of press buttons 114.

Note that the cover of the flip-cover phone 100 is normally flipped back onto the main body 110 in the standby mode. Therefore, the user must hold the phone in the palm of the hand and lift open the cover before talking on receiving a call. Similarly, the cover 120 must be lifted up to expose the buttons 114 on the main body 110 if the user wants to make a call. Obviously, this is a big inconvenience to the user especially when the user is, say, driving a car. The distraction of lifting up the cover 120 on hearing a phone call may cause accidents.

SUMMARY OF INVENTION

Accordingly, one object of the present invention is to provide a flip-cover phone with cover-on talking capability so that a user may receive a phone call or operate the phone without lifting up the cover. Ultimately, the phone is more convenient to use and provides less distraction especially while driving a car.

To achieve these and other advantages and in accordance with the purpose of the invention, as embodied and broadly described herein, the invention provides a mobile phone with cover-on talking capability. The flip-cover phone mainly includes a phone body and a flip cover. The phone body has an inner surface and an outer surface. The inner surface of the phone body has a plurality of keying buttons thereon. Similarly, the flip cover also has an inner surface and an outer surface. The flip cover is hinged to the phone body so that the keying buttons on the inner surface of the phone body can be covered. The outer surface of the flip cover may include a loudspeaker, a microphone and a communication on/off button. In addition, the inner surface of the flip cover may include a first screen and the outer surface of the flip cover may include a second screen. The second screen can be a touch-sensitive screen.

This invention also provides a mobile phone with cover-on talking capability. The mobile phone mainly includes a phone body and a key button cover. The phone body has a plurality of keying buttons. The key button cover is engaged to the phone body through a rotating or sliding mechanism so that the buttons may be hidden behind the cover. A communication on/off button, a loudspeaker and a microphone may be positioned on the surface of the key button cover or the phone body. In addition, the phone body may include a screen within the area covered by the key button cover. The screen can be a touch-sensitive screen.

In this embodiment, a user may press the communication on/off button when the phone rings. Voice signals from the talking terminal will be re-directed to the loudspeaker as soon as the communication on/off button is pressed. In the meantime, the microphone will be activated so that the voice signal from the microphone is transmitted to the talking terminal through a voice processor. Hence, talking may begin without lifting up the flip cover.

If the user needs to operate the mobile phone without lifting the flip cover, one may do so through the touch sensitive screen and execute those instructions by pressing the communication on/off button.

The communication on/off button may even be eliminated if the on/off button is functionally integrated with the touch sensitive screen. Hence, the phone may start to execute the key-in instructions once a region on the touch sensitive screen is touched.

Furthermore, if the user just wants a mobile phone with cover-on talking capability and has no regards for cover-on operating capability, the communication on/off button may be retained and a normal screen instead of a touch sensitive screen may be used to lower production cost.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 2A and 2B are front views of a flip-cover mobile phone according to one preferred embodiment of this invention, one having the cover lifted up and the other having the cover flipped back over the main body;

DETAILED DESCRIPTION

Figure 1B:
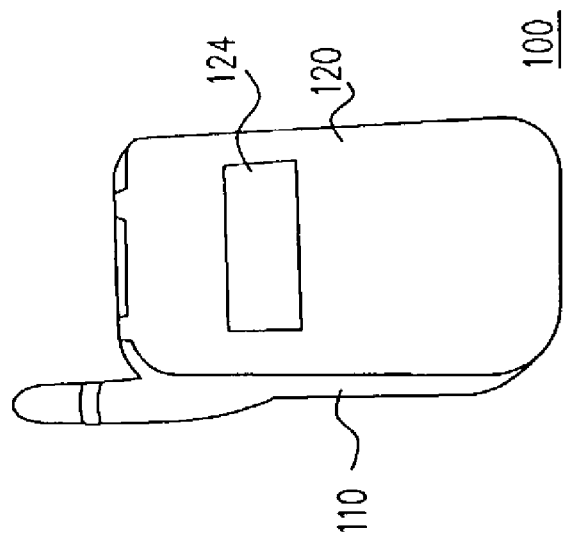
FIGS. 1A and 1B are front views of a conventional flip-cover mobile phone, one having the cover lifted up and the other having the cover flipped back over the main body.
Figure 1A:
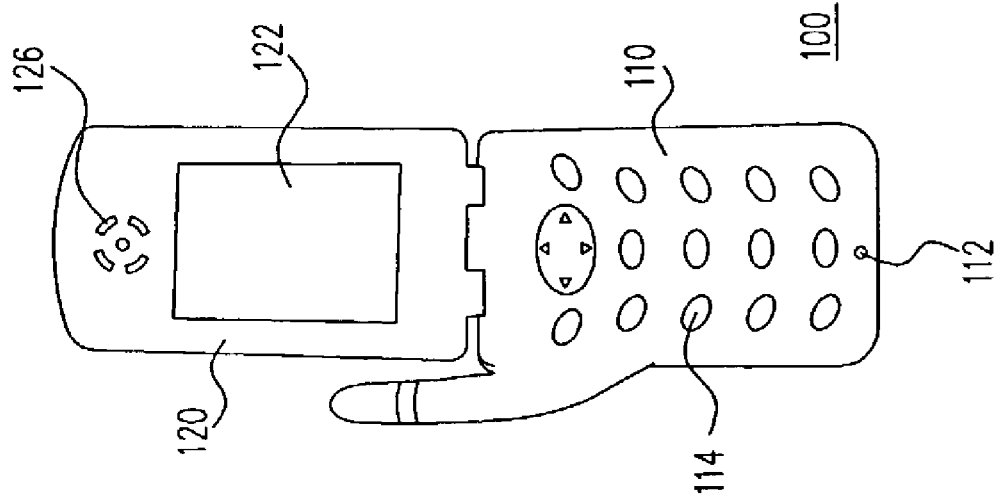

Reference will now be made in detail to the present preferred embodiments of the invention, examples of which are illustrated in the accompanying drawings. Wherever possible, the same reference numbers are used in the drawings and the description to refer to the same or like parts.

FIGS. 2A and 2B are front views of a flip-cover mobile phone according to one preferred embodiment of this invention, one having the cover lifted up and the other having the cover flipped back over the main body. In this embodiment, the flip-cover mobile phone 200 mainly includes a phone body 210 and a flip cover 220. The phone body 210 has an inner surface 212 and an outer surface 214. The flip cover 220 also has an inner surface 222 and an outer surface 224. The flip cover 220 is hinged onto the phone body 210 so that the cover 220 is free to flip open or close. The cover 220 also has a screen 226 (main screen) and a loudspeaker 230 on the inner surface 222 and another screen 228 (a sub-screen) on the outer surface 224. The inner surface 212 of the phone body 210 has a microphone 216 and a plurality of buttons 218 thereon. Since the cover 220 is hinged to the phone body 210, the inner surface 222 of the cover 220 is able to touch the inner surface 212 of the phone body 210. Hence, the buttons 218 on the inner surface 212 can be hidden inside the mobile phone 220.

Note that the outer surface 224 of the cover 220 may further include a loudspeaker 232, a microphone 234 and a communication on/off button 236. Furthermore, the loudspeaker 232 and the microphone 234 may function interchangeably with the aforementioned loudspeaker 230 and the microphone 216.

Figure 2D:
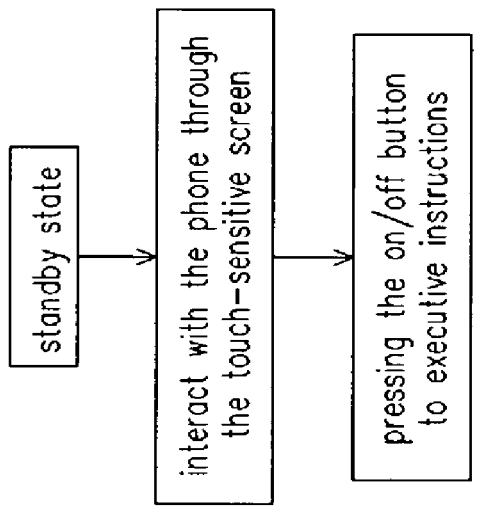
FIG. 2D is a flow chart showing the steps for operating the cover-on talking flip-cover mobile phone according to this invention.
Figure 2C:
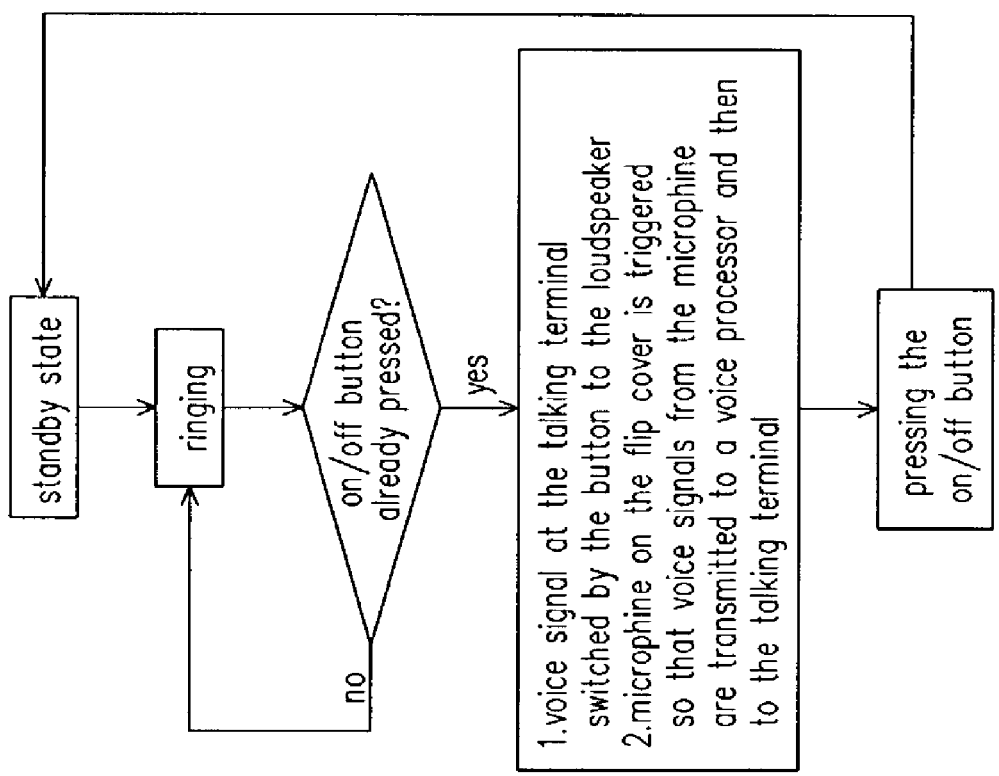
FIG. 2C is a flow chart showing the steps for talking to the cover-on talking flip-cover mobile phone according to this invention.

FIG. 2C is a flow chart showing the steps for talking to the cover-on talking flip-cover mobile phone according to this invention. As shown in FIGS. 2B and 2C, in the standby mode (with the cover over the phone body), the communication on/off button 236 on the flip cover 220 is checked to see if it is pressed when the phone 200 rings. If no one presses the communication on/off button 236, the ringing continues. Otherwise, if the communication on/off button 236 is pressed, the talking terminal picks up audio signals from the caller so that the communication on/off button 236 is switched to the loudspeaker 232. In the meantime, the microphone 234 on the cover 220 is triggered so that the voice signals received by the microphone 234 are transmitted to an audio processor. After processing, the voice signal is sent to the talking terminal, thereby fulfilling cover-on phone receiving. After the talking is over, the communication on/off button 236 is again pushed to return the phone to the standby mode. In other words, one press of the communication on/off button 236 enables a user to receive an incoming call and another press on the on/off button 236 to end a talking session. Hence, the user is free from too much distraction, especially when driving a car.

In addition, the screen 224 on the outer surface 224 of the flip cover 220 can be a touch sensitive screen. The touch screen is an information exchange interface tool having a variety of specially designed icons for selection. When one of the icons is selected through touching the screen, another picture may appear on the screen so that the required information is displayed. Hence, by using touch-screen technologies, a user may operate the mobile phone without flipping open the cover.

FIG. 2D is a flow chart showing the steps for operating the cover-on talking flip-cover mobile phone according to this invention. As shown in FIGS. 2B and 2D, in the standby mode (without lifting the cover), the touch screen is used as an interface with the phone. For example, the touch screen can be used to find data or dial a telephone number. An instruction, which is a confirmation instruction, is executed when the communication on/off button 236 is pressed. Using phone dialing as an operating example, a finger may be used to touch one of the items on a preset phone book so that the required data is recalled. If the recalled data matches the desired dial-up number, the communication on/off button 236 is pressed to dial up the number. In other words, the mobile phone may operate with the cover on the phone body. However, if the recalled data is not the correct number, the touch screen may be triggered by touch to scroll down and display more data so that the user may be able to find a matching number.

Furthermore, the communication on/off button 236 may be functionally integrated with the touch screen so that the communication on/off button 236 is physically removed from the phone. In this case, a confirmation icon may appear on the touch screen. Once the desired dialing number is found, the dialing instruction is executed by dialing the number with a single touch of the confirmation button. Hence, cover-on operation of the mobile phone is attained.

In some situations such as driving, a user needs to receive phone calls much more frequently than dialing. If this is the case, some cost for producing the phone 200 may be saved by retaining the communication on/off button 236 while replacing the touch screen with an ordinary screen.

Figure 3B:
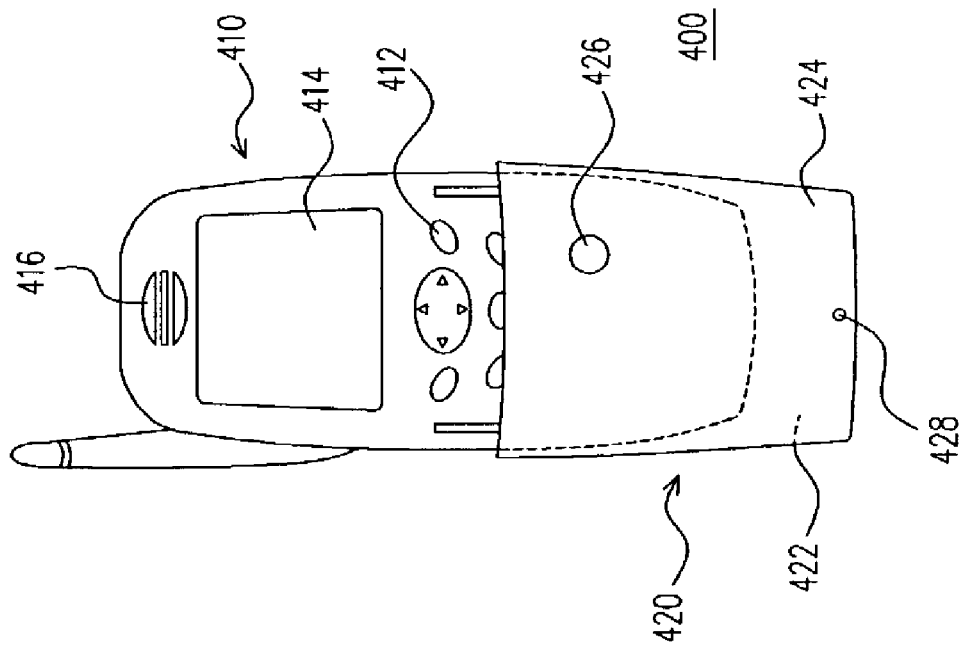
FIG. 3B is a front view of a flip-cover mobile phone according to yet another embodiment of this invention.
Figure 3A:
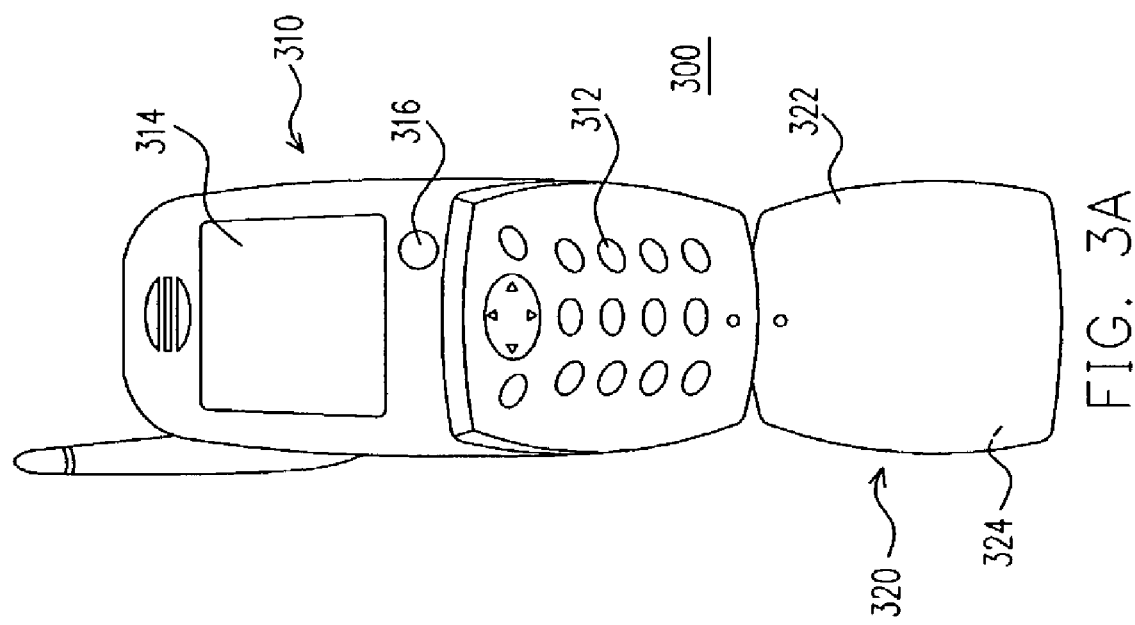
FIG. 3A is a front view of a flip-cover mobile phone according to another embodiment of this invention.

FIG. 3A is a front view of a flip-cover mobile phone according to another embodiment of this invention. The flip-cover phone 300 in FIG. 3A has a phone body 310 and a key button cover 320. The phone body 310 has a plurality of buttons 312 thereon. The key button cover 320 is hinged onto the phone body 310 so that the buttons 312 may be covered. The key button cover 320 has an inner surface 322 and an outer surface 324. The key button cover 320 may connect with the phone body 310 through a rotating mechanism. Through rotation, the inner surface 322 of the key button cover 320 may fit snugly over the phone body 310 so that the buttons 312 are hidden behind the cover 320. Conversely, the buttons 312 can be exposed through rotation.

Note that the communication on/off button 316 may be installed on the phone body 310 or on the outer surface 324 of the key button cover 320. In this embodiment, the communication on/off button is installed on the phone body 310. In addition, a loudspeaker 317 and a microphone 318 may also be installed on the key button cover 320 or the phone body 310 as well. In this embodiment, the loudspeaker 317 and the microphone 318 are installed on the phone body 310. The phone body 310 further includes a screen 314. The screen 314 is positioned within the area covered by the key button cover 320. The screen 314 can be a touch-sensitive screen and the communication on/off button 316 can be disposed of by functionally integrating it with the touch screen.

FIG. 3B is a front view of a flip-cover mobile phone according to yet another embodiment of this invention. The flip-cover phone 400 in FIG. 3B has a phone body 410 and a key button cover 420. The phone body 410 has a plurality of key buttons 412 thereon. The key button cover 420 is hinged onto the phone body 410 capable of covering up the key buttons 412. The key button cover 420 has an inner surface 422 and an outer surface 424. The key button cover 420 connects with the phone body 410 through a sliding mechanism. Through sliding, the inner surface 422 of the key button cover 420 may snugly fit over the phone body 410 so that the buttons 412 are hidden behind the cover 420. Conversely, the buttons 412 can be exposed through sliding.

Note that the communication on/off button 426 may be installed on the phone body 410 or on the key button cover 420. In this embodiment, the communication on/off button 426 is installed on the outer surface 424 of the key button cover 420. In addition, a loudspeaker 416 and a microphone 428 may also be installed on the key button cover 420 or the phone body 410 as well. In this embodiment, the loudspeaker 416 is installed on the phone body 410 while the microphone 428 is installed on the outer surface 424 of the key button cover 420. The phone body 410 further includes a screen 414. The screen 414 is positioned within the area covered by the key button cover 420. The screen 414 can be a touch-sensitive screen and the communication on/off button 426 can be disposed of by functionally integrating it with the touch screen.

In conclusion, major advantages of this invention include:

1. Through a communication on/off button on the surface of a mobile phone, a flip-cover phone may receive incoming calls without having to flip open the cover.

2. By installing a touch sensitive screen on the front surface of a flip-cover mobile phone, the mobile phone can be manipulated to perform all the necessary operations without having to flip open the cover.

3. The cover-on phone according to this invention can be used in any mobile phone with hidden buttons and hence can be deployed in a significant section of the mobile phone market.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A flip-cover mobile phone with cover-on talking capability, comprising:
   a phone body having an inner surface and an outer surface;
   a plurality of key buttons on the inner surface of the phone body;
   a flip cover hinged to the phone body that can covet over the key buttons, wherein the flip cover has an inner surface and an outer surface;
   a loudspeaker on the outer surface of the flip cover;
   a microphone on the outer surface of the flip cover; and
   a communication on/off button on the outer surface of the flip cover, which can be activated to receive and terminate a call without lifting up the flip cover.

2. The flip-cover mobile phone of claim 1, further comprising a first screen on the inner surface of the flip cover.

3. The flip-cover mobile phone of claim 1, further comprising a second screen on the outer surface of the flip cover.

4. The flip-cover mobile phone of claim 3, wherein the second screen includes a touch-sensitive screen.

5. A mobile phone, comprising:
   a phone body;
   a plurality of key buttons on the phone body;
   a key button cover coupled to the phone body in a movable manner that can cover and expose the key buttons;
   a loudspeaker on an outer surface of the key button cover or a surface of the phone body;
   a microphone on an outer surface of the key button cover or the surface of the phone body; and
   a communication on/off button on an outer surface of the key button cover, which can be activated to receive and terminate a call when the key button cover covers the key buttons, or on the phone body.

6. The mobile phone of claim 5, wherein the communication on/off button is positioned on the phone body.

7. The mobile phone of claim 5, wherein the communication on/off button is positioned on the outer surface of the key button cover.

8. The mobile phone of claim 5, further comprising a first screen on the phone body.

9. The mobile phone of claim 8, wherein the first screen is positioned in a location outside the area covered by the key button cover.

10. The mobile phone of claim 5, wherein the first screen includes a touch-sensitive screen.

11. The mobile phone of claim 5, wherein the key button cover is coupled to the phone body through a rotation mechanism so tat the key buttons may be exposed when the key button cover is rotated away from the phone body.

12. The mobile phone of claim 5, wherein the key button cover is coupled to the phone body through a sliding mechanism so that the key buttons are exposed when the key button cover is slid with respect to the phone body.

13. A mobile phone, comprising:
   a body;
   a speaker operatively coupled to the body;
   a microphone operatively coupled to the body;
   a plurality of keys defined on the body, which are normally used for making calls;
   a cover coupled to the body in a movable manner, from a first position in which the keys are covered, to a second position in which the keys are exposed, the cover having an outer surface facing away front the keys; and
   an on/off key defined on the outer surface of the cover, which can be activated to receive and terminate a call when the cover is in the first position.

14. The mobile phone as in claim 13, wherein the on/off key comprises a button positioned on the outer surface of the cover.

15. The mobile phone as in claim 13, wherein the on/off key comprises an icon defined on a touch screen positioned on the outer surface of the cover.

16. The mobile phone as in claim 13, wherein the microphone is operatively coupled to the body via the cover, and wherein the microphone is on the outer surface of the cover.

17. The mobile phone as in claim 13, wherein the speaker is operatively coupled to the body via the cover, wherein the speaker is on the outer surface of the cover.

18. The mobile phone as in claim 13, wherein the cover is coupled to the body by a hinge such that the keys can be exposed by rotating the cover away from the keys.

19. The mobile phone as in claim 13, wherein the cover is coupled to the body by a sliding mechanism such that the keys can be exposed by sliding the cover relative to the body.

* * * * *